United States Patent [19]
Kulwicki et al.

[11] Patent Number: 5,368,834
[45] Date of Patent: Nov. 29, 1994

[54] METHOD FOR PRODUCING TITANATE POWDER AND PRODUCT MADE THEREBY

[75] Inventors: Bernard M. Kulwicki, North Attleboro; David F. Lynch, Attleboro, both of Mass.; Stanley J. Lukasiewicz, Rumford, R.I.

[73] Assignee: Texas Instruments Incorporated, Dallas, Tex.

[21] Appl. No.: 106,259

[22] Filed: Aug. 13, 1993

[51] Int. Cl.$^5$ .............................. C01G 23/00
[52] U.S. Cl. ....................... 423/598; 264/9; 501/137
[58] Field of Search ............ 423/598; 264/9; 501/137

[56] References Cited
U.S. PATENT DOCUMENTS

| | | | |
|---|---|---|---|
| 3,637,531 | 1/1972 | Faxon et al. | 252/520 |
| 3,932,313 | 1/1976 | Reynolds et al. | 252/520 |
| 3,983,077 | 9/1976 | Fuller et al. | 252/520 |
| 4,331,707 | 5/1982 | Muruska et al. | 427/74 |
| 4,571,350 | 2/1986 | Parker et al. | 427/109 |
| 5,021,399 | 6/1991 | Hsu et al. | 505/1 |
| 5,034,372 | 6/1991 | Matsuno et al. | 505/1 |
| 5,081,102 | 1/1992 | Gay et al. | 505/1 |
| 5,114,702 | 5/1992 | Pederson et al. | 423/639 |

OTHER PUBLICATIONS

Single-Crystal $Y_1Ba_2Cu_3O_7$ Particle Formation by Spray Pyrolysis by T. Kodas et al.–Apr. 25, 1989.
Aerosol Fabrication of High $T_c$ Superconducting Thick Film by M. Bedekar et al.–Apr. 25, 1989.
Microstructure of $S_rT_1O_3$ Spherical Fine Particles Prepared by Ultrasonic Spray Pyrolysis of Metal Alkoxide by O. Sakurai et al.–Feb. 18, 1986.

*Primary Examiner*—Karl Group
*Assistant Examiner*—Deborah Jones
*Attorney, Agent, or Firm*—Russell E. Baumann; Richard L. Donaldson; Rene' E. Grossman

[57] ABSTRACT

Titanate ceramic materials are made by forming a common solution (10) of barium acetate, strontium acetate, isopropyl titanate, lactic acid and water, forming a mist of particles of approximately 50 um or smaller, directing a carrier stream of gas (14) through the mist into a reaction zone in a furnace (20) where the material is pyrolyzed and then collected as a powder in a filter (24) or deposited onto a substrate. The tetra-isopropyl titanate and lactic acid may be replaced by commercially available titanium ammonium lactate. In a first embodiment the carrier gas is an oxidizing gas while in a second embodiment it is an inert gas resulting in powder having greater density.

13 Claims, 7 Drawing Sheets

METHOD FOR PRODUCING TITANATE POWDER AND PRODUCT MADE THEREBY

BACKGROUND OF THE INVENTION

This invention relates generally to ceramics and more particularly to a process for making ceramic forming titanate material such as barium strontium titanate having optimum electrical properties and a product made by such process.

Various titanate ceramic materials are useful in the electronics industry due to their electrical properties. Material having a high dielectric constant, for example, is useful in making capacitors. Other desirable characteristics relate to the pyroelectric coefficient for materials used, for example, as infra red detectors and materials having a steep sloped positive coefficient of resistivity for use as thermal sensors. Typically, such ceramic forming materials, provided in powdered form, are combined with an organic binder and pressed into a desired configuration and sintered to form a ceramic. For many devices it is important to use a powder which has a very small, uniform particle size and which is very dense so that the powder can be formed into very small and precise configurations. By way of example in microminiature heat sensing devices, material used as infra red (IR) detectors may be formed into a large number of pixels, in the order of several thousand per square centimeter. A dense powder formed of small, uniform particles used in making such configurations is needed to avoid occlusions, voids and the like.

Barium strontium titanate powder made for IR detectors has been made by direct pyrolysis of a common solution of precursor materials including barium acetate, strontium acetate, tetra-isopropyl titanate, lactic acid and water of approximately 10–15% product by weight using the teaching of U.S. Pat. No. 3,637,531. The common solution can also be provided by substituting titanium ammonium lactate for tetra-isopropyl titanate and lactic acid. This method for making the material has the advantage of enabling precise stoichiometric control and therefore obtaining optimum electrical properties for the particular composition in question. Another advantage provided by this process is that compositional modifications in the ratio of barium/strontium, partial substitution of ions such Ca, Pb or Zr, and addition of dopants such as Mn, Fe, Co, Y, Nb, etc., are easily achieved since these constituents can be readily dissolved and combined in the common solution.

Direct calcination of such a solution, however, results in the formation of tenaciously bound aggregates in the final powder, even after intensive milling as in a tungsten carbide ring mill. These aggregates lead to defects in the final ceramic, for example, tiny areas of low density. When the material is intended for use, for example, as infra red detectors, this can result in missing or poorly formed pixels. Even in applications where such tiny defects are not as critical the milling process represents an undesirable expenditure of time and energy.

It is an object of the present invention to provide an improved method for producing powder suitable for making ceramic material and the provision of material both in powder and coated form, produced by such method.

SUMMARY OF THE INVENTION

Briefly, in accordance with a first embodiment of the invention, the same common solution referred to above used to directly calcine is instead vaporized into extremely fine droplets containing the metallic constituents of the titanate material in the order of equal to or less than 50 micrometers using an ultrasonic nebulizer. The droplets are entrained in a stream of air or oxygen and directed through a furnace and are pyrolyzed at a temperature in the range of 700°–15000° C. Entraining the droplets in the stream of air or oxygen maintains separation among the particles until the reaction is complete thereby avoiding formation of tenacious aggregates.

In accordance with a second embodiment of the invention, a non-oxidizing entraining or carrier gas such as nitrogen is used in producing the powder comprising oxide particles, such as barium strontium titanate. Powder made in accordance with this embodiment forms a denser powder than that of the first embodiment.

In either embodiment the powder can be collected for subsequent forming into a selected configuration as by molding or it can be direct deposited on a substrate, for example, to provide a dielectric layer on an integrated circuit.

Other objects, advantages and details of the methods and material of this invention appear in the following detailed description of preferred embodiments of the invention.

DETAILED DESCRIPTION OF THE PREFERRED EMBODIMENTS

Figure 1:
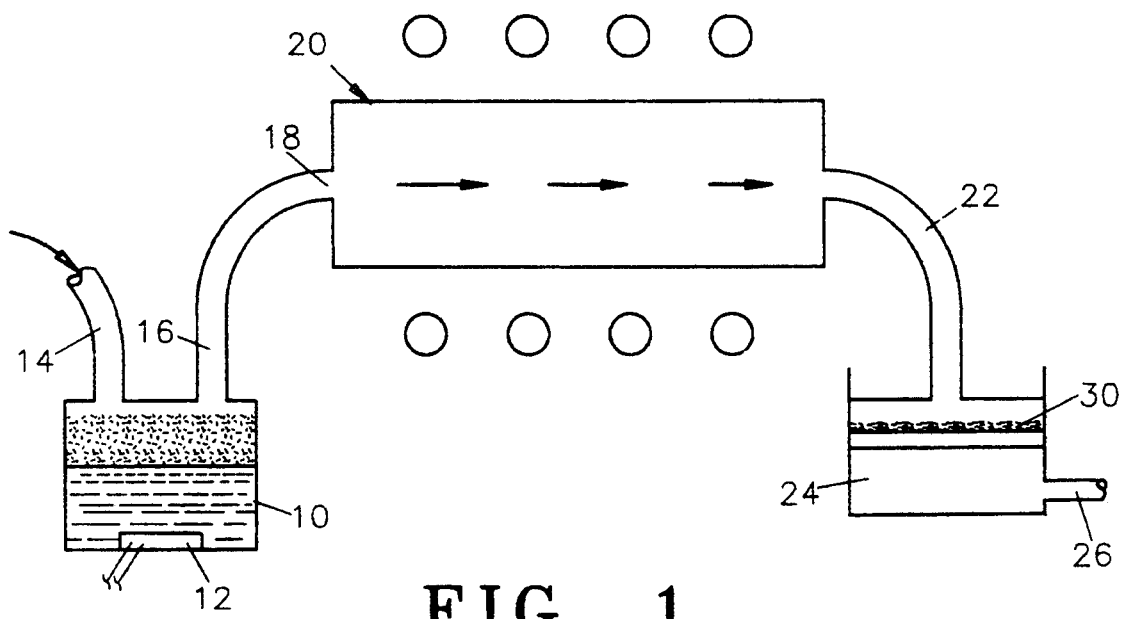
FIG. 1 is a schematic representation of apparatus used to carry out the method of the invention.

In accordance with the invention a common solution containing the metallic constituents in their proper proportions, e.g., a solution of barium acetate, strontium acetate, tetra-isopropyl titanate such as Tyzor-TPT available from E. I. DePont de Nemours and Company, lactic acid and water of approximately 10–15% product by weight is prepared. For example, 4000 grams of tetra-isopropyl titanate (TPT) is dissolved in 4000 grams of 85% lactic acid and 3000 grams deionized water. The ph is adjusted to approximately 8.0 using ammonium hydroxide. The solution is then assayed by pyrolysis to determine the percent $TiO_2$ (typically about 9% by weight). For a 10 g mols (2.16 Kg) barium strontium titanate (BST) of 66% Ba/34% Sr a solution was prepared using 8630.4 grams of TPT/lactic acid solution containing 9.26% $TiO_2$, 1710.3 grams barium acetate (53.0% Ba), 739.2 grams strontium acetate (40.3% Sr) and 3341.8 grams of deionized water. The final solution corresponded to 15% BST by weight.

Alternatively, titanium ammonium lactate, such as Tyzor-LA, typically 14% $TiO_2$, available from E. I. DuPont de Nemours and Company can be used in place of TPT and lactic acid. For 10 g mols of BST of 66% Ba/34% Sr, the following is required: 5707.1 grams titanium ammonium lactate (14.0% $TiO_2$), 1710.3 grams barium acetate (53.0%), 739.2 grams strontium acetate (40.3% Sr) and 625 grams deionized water. A common solution is formed of approximately 15% BST by weight.

With reference to FIG. 1, the solution, diluted with water, is placed in container 10 forming a reservoir with an ultrasonic nebulizer 12 disposed on the bottom of container 10. An inlet tube 14 adapted to provide a carrier gas such as air and an outlet tube 16 adapted to conduct mist entrained in the carrier gas away from the reservoir are coupled to container 10. Outlet tube 16 is coupled to inlet 18 of a conventional furnace 20 having the capability of providing a chamber temperature at least as high as 1500° C. Outlet 22 of furnace 20 is coupled to a filter system 24 including exhaust 26.

The system is sealed except for inlet tube 14 and exhaust 26. In accordance with the first embodiment of the invention a stream of carrier gas of air is directed into container 10 and mist generated by nebulizer 12 is carried into furnace 20 where the solution droplets, still maintained separated from one another by the carrier gas, are dried and pyrolyzed and then deposited in the form of powder on suitable filter material, such as a woven Gore-tex. Gore-tex is a trademark of W. L. Gore & Associates, Inc. for fibrillated teflon. Teflon is a trademark of Dupont de Nemours for polytetrafluoroethylene.

The method of the invention was carried out using a DeVilbiss Ultra-Neb 99 ultrasonic nebulizer which produces very small droplets, in the order of $\leq 50$ um. The furnace used is an electrically heated, 25000 watt furnace having an inside diameter of approximately 5 inches and a volume of approximately 20 liters and a maximum temperature of 1500° C. A flow rate of approximately 7½ liters per minute provided a suitable residence time in the furnace using a temperature of 1200° C. The flow rate was provided using a PIAB Vacuum Conveyor Model VC100 at the exhaust 24 creating a pressure of approximately one inch of water at the entrance to the furnace.

In small scale runs using 100 ml of solution of a layer of Gore-tex weave approximately 6 inches in diameter was used as a filter and powder 30 was allowed to accumulate on the layer. The Gore-tex weave permitted an accumulation in the order of a gram of powder before it interfered with flow through the filter and had to be scraped off.

In larger scale runs a filter bag was used with periodic reverse pulses of air to dislodge the powder from the bag and cause the powder to drop into a collection container.

Figure 2A:
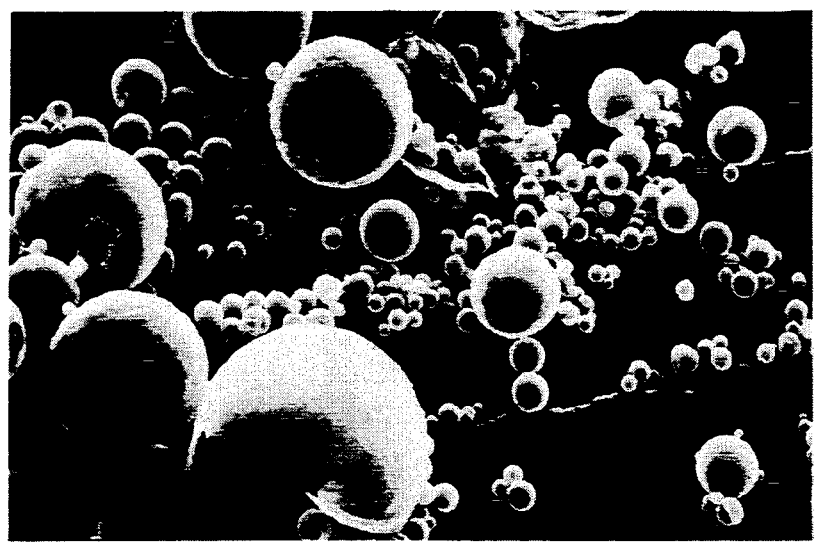
FIGS. 2a and 2b are microphotographs of barium strontium titanate particles made in accordance with a first embodiment of the invention shown at 2100 and 1000 times magnification respectively.
Figure 2B:
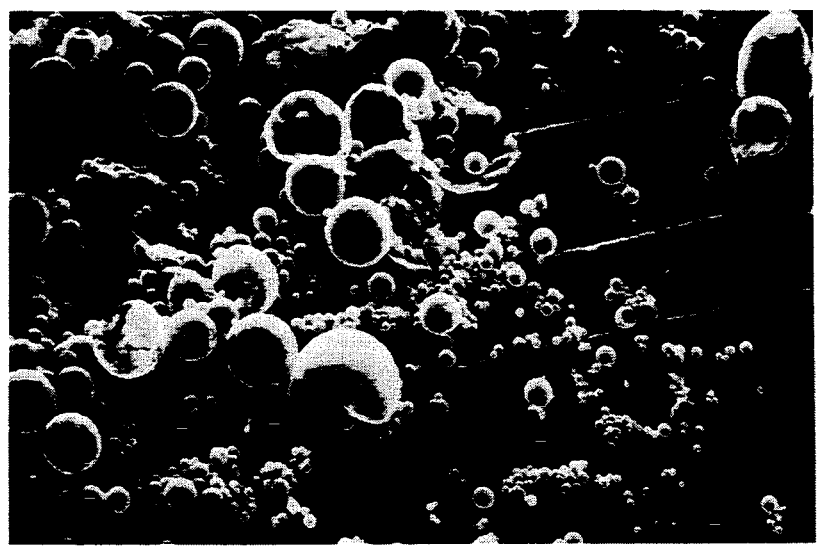

The collected powder was somewhat fluffy, a certain percentage of which comprised hollow spheres, as shown in FIGS. 2a and 2b, microphotographs enlarged 2100 and 1000 times respectively. This material was compacted by crushing the hollow spheres using a pestle and mortar. Another batch of this material was subjected to intensive milling in a tungsten carbide ring mill.

Figure 4A:
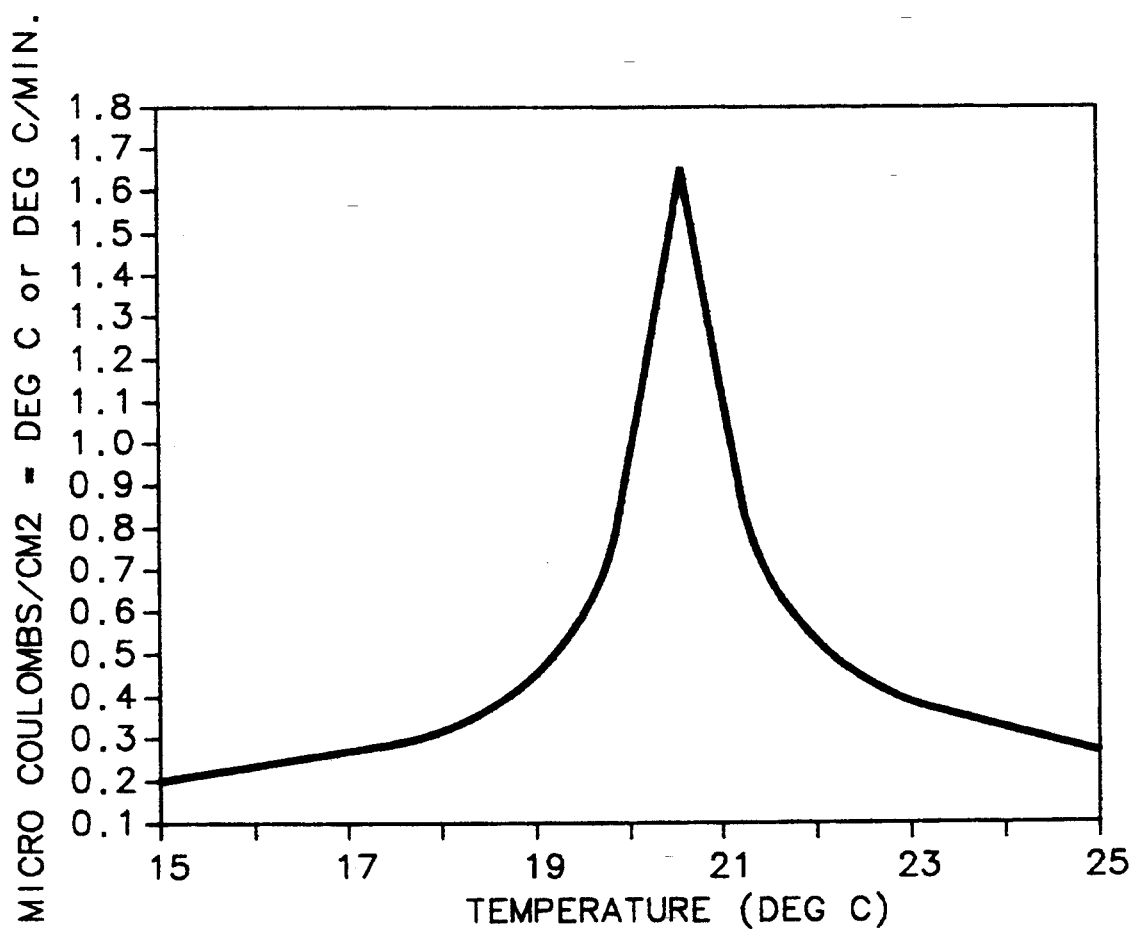
FIGS. 4a and 4b are graphs of pyroelectric coefficient vs temperature and dielectric constant vs temperature respectively for material made in accordance with the first embodiment of the invention.
Figure 4B:
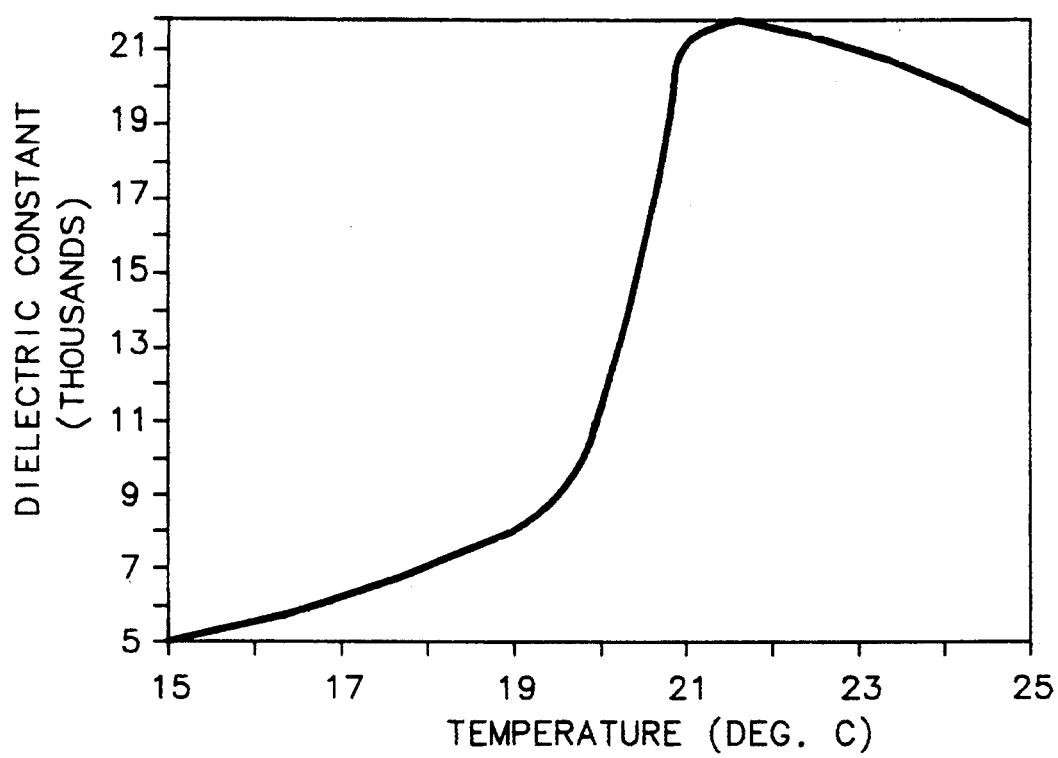
Figure 5A:
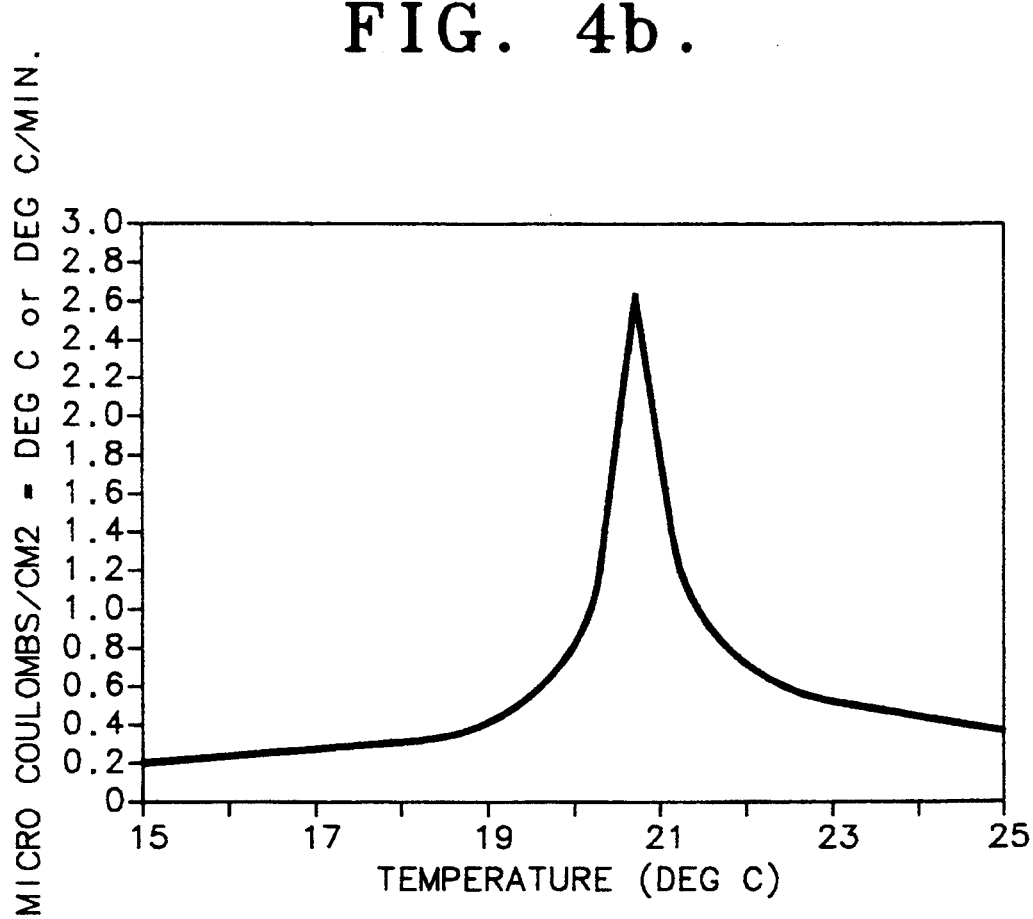
FIGS. 5a and 5b are graphs of pyroelectric coefficient vs temperature and dielectric constant vs temperature respectively for material made in accordance with the second embodiment of the invention.
Figure 5B:
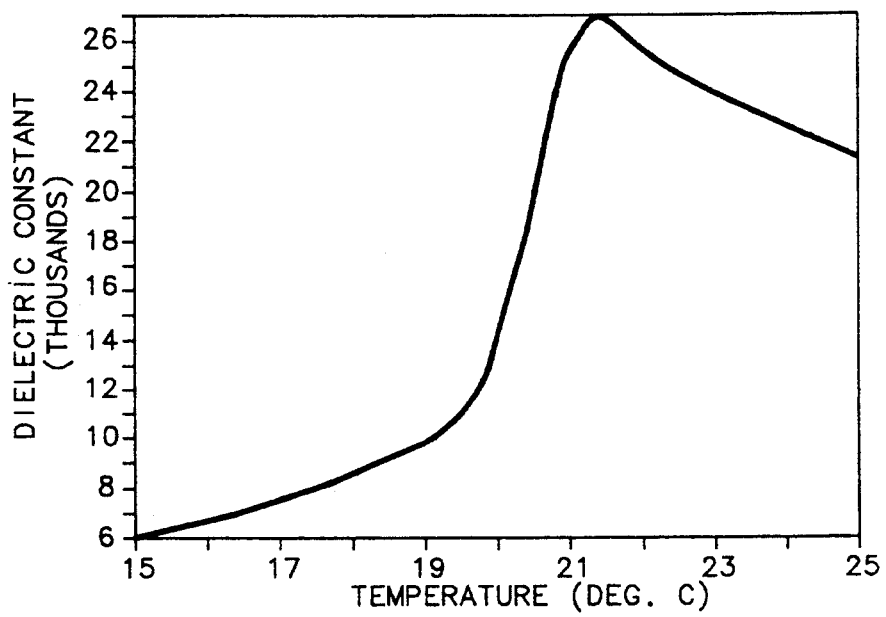
Figure 6:
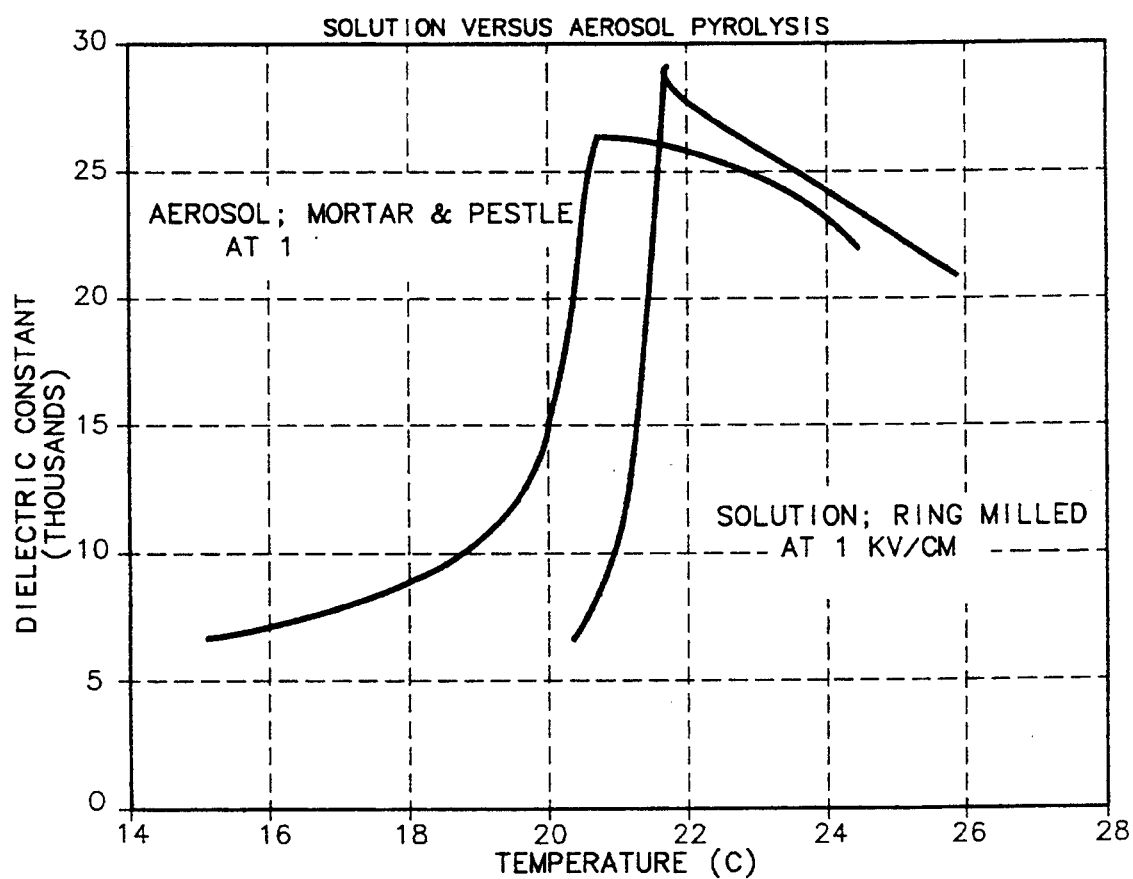
FIG. 6 is a graph of dielectric constant vs temperature of material made in accordance with the invention as well as material made in accordance with prior art teaching.

Samples of the pestle and mortar and the ring milled material were prepared by adding polyethylene glycol as a binder and pressing into a round configuration having an area of 0.10 square cm and a thickness of 0.30 mm and provided with electrical contacts of Ag/Pd. Tests of pyroelectric coefficient vs temperature and dielectric constant vs temperature were conducted on the samples with the results shown in FIGS. 4a and 4b for the ring mill and FIGS. 5a and 5b for the mortar and pestle. It will be noted that both the pyroelectric coefficient and dielectric constant are significantly higher in the mortar and pestle samples. This is due to contaminants introduced into the powder during the milling process. As shown in FIG. 6 the dielectric constant vs temperature characteristics of material prepared by direct pyrolysis and in accordance with the method of the invention are comparable.

Figure 3A:
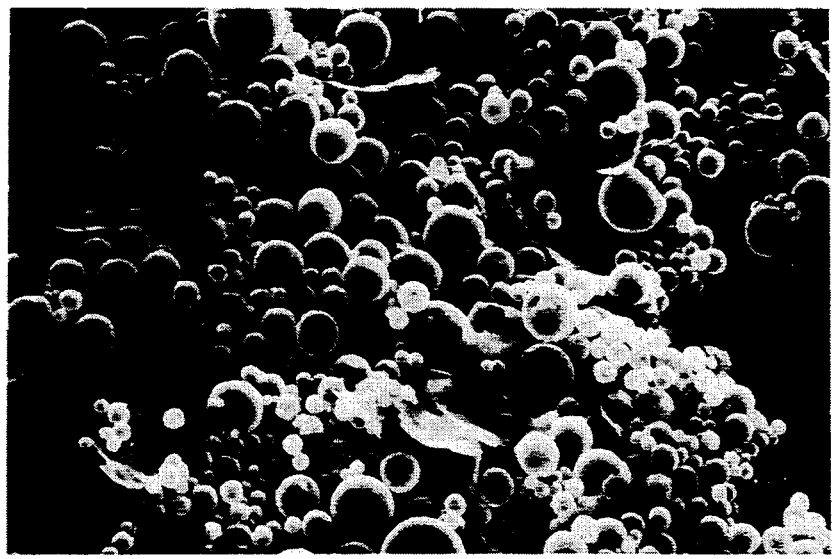
FIGS. 3a and 3b are microphotographs of barium strontium titanate particles made in accordance with a second embodiment of the invention shown at 2000 and 1000 times magnification respectively.
Figure 3B:
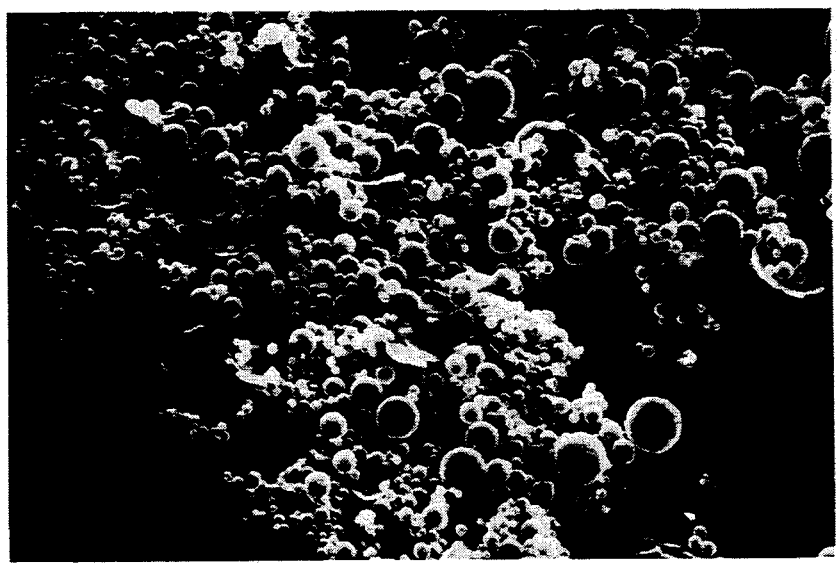
Figure 7:
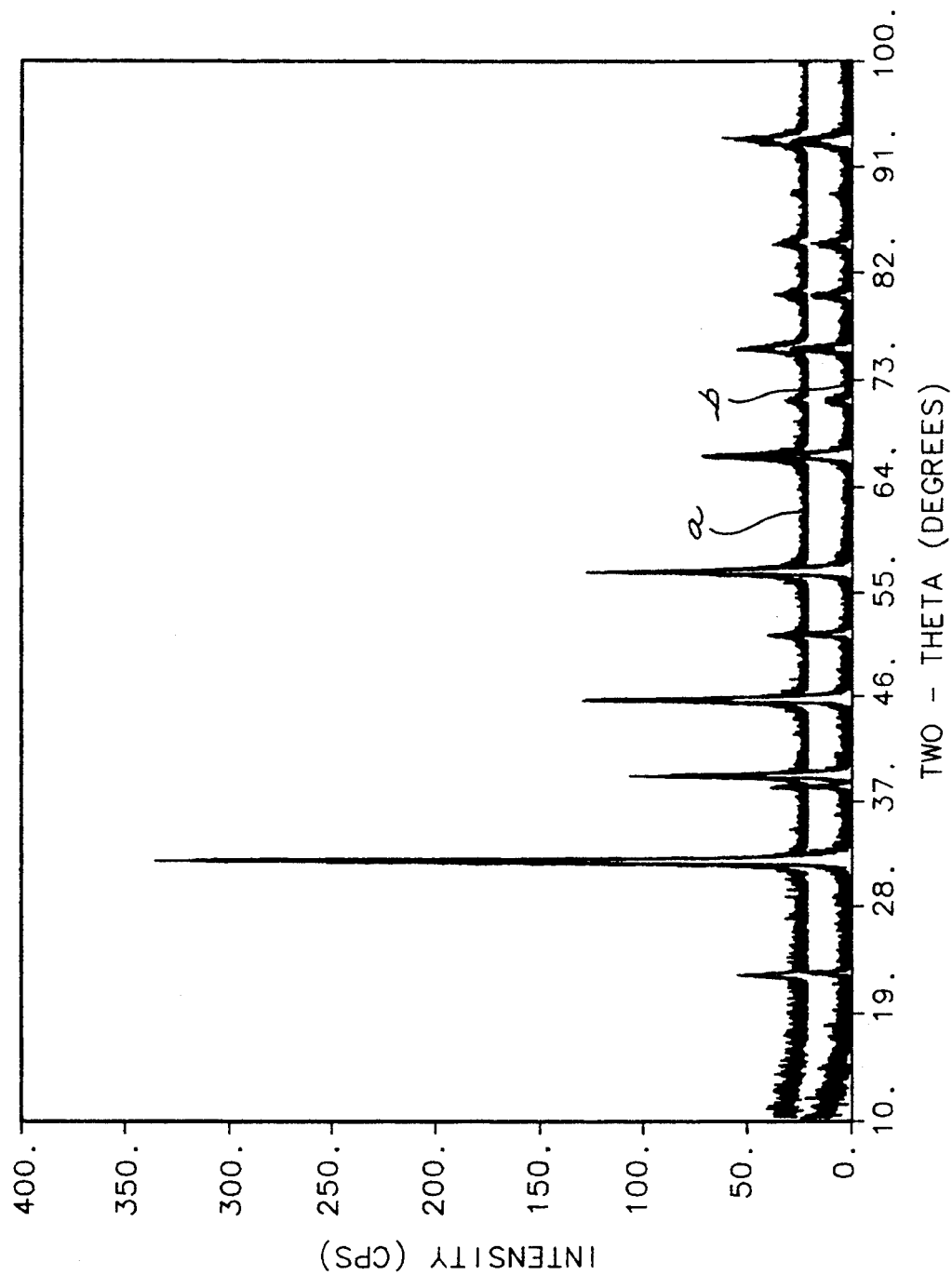
FIG. 7 is a graph showing the results of x-ray diffraction of samples made in accordance with both the first and second embodiments of the invention.

In accordance with a second embodiment, the same solution was used with the same operation conditions as described above except that a non-oxidizing gas, i.e., nitrogen, was used as the carrier gas. Powder produced in accordance with the second embodiment has a higher bulk density comprising fewer and smaller hollow spheres, as can be observed in comparing FIGS. 3a and 3b, powder particles produced in accordance with the second embodiment of the invention using nitrogen as a carrier gas relative to powder particles, shown in FIGS. 2a and 2b, powder particles produced in accordance with the first embodiment using air as a carrier gas. Performing pyrolysis in the presence of nitrogen apparently reduces the rate at which the organics are evolved. FIG. 7 shows the results of an x-ray diffraction of powder particles according to the first (curve a) and second (curve b) embodiments with the plots of the two offset 0.40 demonstrating that the same single phase ceramic was obtained in both embodiments. The powder produced in the nitrogen atmosphere is denser, requiring little or no crushing with a mortar and pestle and is particularly suitable for use in making small, precisely defined configurations, such as the pixels used for IR detectors mentioned above. By way of example, powder produced in accordance with the first embodiment had a bulk density of 0,137 g/cc whereas powder produced in the nitrogen had a bulk density of 0,159 g/cc.

In accordance with a third embodiment of the invention, a substrate is placed in filter 24 so that the pyrolyzed particles impinge directly on the substrate forming a coating thereon. Samples were made in which a coating of 5-10 microns was deposited on the substrate. Depositing a dielectric layer directly from the pyrolyzed particles can be used in making various electronic elements, such as IR detectors which are then reticulated to form a plurality of pixels, or forming solid state capacitors on IC's for example.

The process of the invention has many advantages. The solution is vaporized at a low temperature—a temperature generally well below the boiling point of any of the constituents of the solution—so that its metallic composition is not changed during the vaporization process as it would be if it were vaporized by heating. Ultrasonic atomizers produce droplets smaller than those produced by conventional spray nozzles which normally produce droplets in the order of 200 um or larger. Conventional spray nozzles also result in introducing contaminants. For example, lactic acid reacts with stainless steel used in nozzles producing contaminants which adversely affect the electrical characteristics of the powder. The ultrasonic atomizers, on the other hand can be used without adding contaminants and produce significantly smaller droplets which in turn pyrolyze to relatively smaller particles, thereby improving the small scale electrical and mechanical properties of the eventual ceramic device. Milling of the titanate compound employed in producing such material by prior art methods with its concomitant contamination is obviated. Aggregation is generally avoided by isolating the droplets in the carrier gas preventing them from combining with one another.

AS various changes could be made in the above methods without departing from the scope of the invention, it is intended that all matter contained in the above description or shown in the accompanying drawings shall be interpreted as illustrative and not in a limiting sense.

We claim:

1. A method for making barium strontium titanate material comprising the steps of forming a common solution of metal organic precursor materials, placing the solution in a reservoir, subjecting the solution in the reservoir to ultrasonic vibration to form a mist, entraining droplets of the mist in a carrier stream of gas, directing the carrier stream into a furnace, subjecting the droplets to a temperature of at least 700° C. for a selected period of time to pyrolyze the droplets into particles and collecting the pyrolyzed particles.

2. A method according to claim 1 in which the gas is air.

3. A method according to claim 1 in which the gas is oxygen.

4. A method according to claim 1 in which the gas is inert.

5. A method according to claim 1 in which the gas is non-oxidizing nitrogen.

6. A method according to claim 1 in which the mist is subjected to a temperature of approximately 1200° C.

7. A method according to claim 1 in which the pyrolyzed particles are deposited directly onto a substrate.

8. A method for making ceramic forming titanate material comprising the steps of producing droplets of approximately 50 micrometers or less of a solution which contains the metallic constituents of the titanate material, entraining the droplets in a carrier stream of gas and pyrolyzing the droplets.

9. A method according to claim 8 in which the droplets are produced by an ultrasonic nebulizer.

10. A method according to claim 8 in which the gas is an oxidizing gas.

11. A method according to claim 8 in which the gas is inert.

12. A method according to claim 8 in which the pyrolysis occurs by heating the droplets and the gas to a temperature in the range of approximately 700° C. to 1500° C.

13. A method for making barium strontium titanate material comprising the steps of forming a common solution of precursor materials of barium acetate, strontium acetate and titanium lactate chelate, placing the solution in a reservoir, subjecting the solution in the reservoir to ultrasonic vibration to form a mist, entraining droplets of the mist in a carrier stream of non-oxidizing nitrogen gas, directing the carrier stream into a furnace, subjecting the droplets to a temperature of at least 700° C. for a selected period of time to pyrolyze the droplets into particles and collecting the pyrolyzed particles.

* * * * *